Sept. 26, 1961  A. LEISS ET AL  3,001,395
AIR FRAME DRAG BALANCE
Filed Jan. 15, 1960  2 Sheets-Sheet 1

INVENTORS
ABRAHAM LEISS
JOSEPH H. JUDD
ROBERT S. FREEMAN
BY
ATTORNEYS

Sept. 26, 1961     A. LEISS ET AL     3,001,395
AIR FRAME DRAG BALANCE
Filed Jan. 15, 1960     2 Sheets-Sheet 2
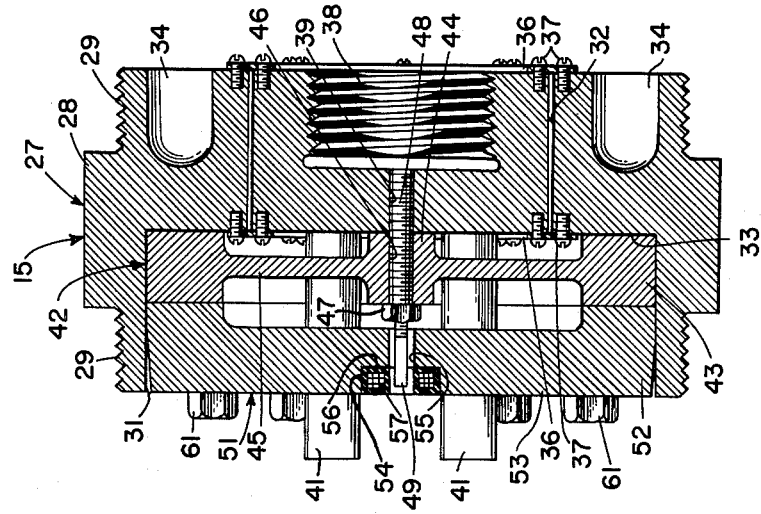
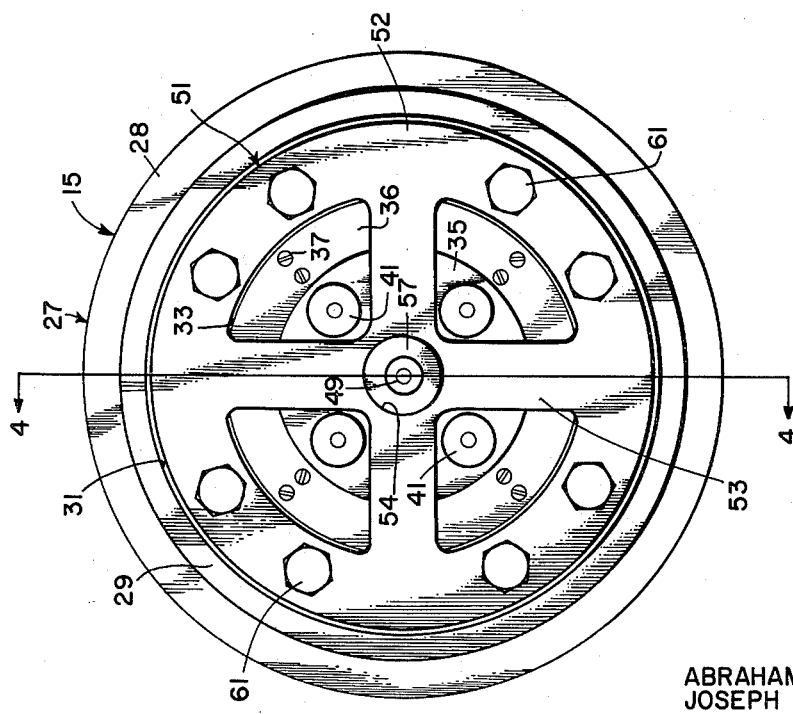
INVENTORS
ABRAHAM LEISS
JOSEPH H. JUDD
ROBERT S. FREEMAN
BY
ATTORNEYS

United States Patent Office 3,001,395
Patented Sept. 26, 1961

3,001,395
AIR FRAME DRAG BALANCE
Abraham Leiss, Hampton, Joseph H. Judd, Newport News, and Robert S. Freeman, Yorktown, Va., assignors to the United States of America as represented by the Administrator of the National Aeronautics and Space Administration
Filed Jan. 15, 1960, Ser. No. 2,792
7 Claims. (Cl. 73—147)
(Granted under Title 35, U.S. Code (1952), sec. 266)

The invention described herein may be manufactured and used by or for the Government of the United States of America for governmental purposes without the payment of any royalties thereon or therefor.

This invention relates generally to a device for measuring frictional forces tending to impede the movement of a body through a fluid medium, and more particularly to a device for measuring drag forces acting upon an aerial vehicle moving through the atmosphere.

It is common knowledge in the aeronautical field that the thrust developed by the motor or motors of an aerial vehicle is largely expended in overcoming drag forces imposed upon the vehicle as it moves through the air. The most important of these forces is aerodynamic drag, resulting from turbulence generated in the flow of air passing around the vehicle. In the design of the vehicle, a great deal of time and thought is expended in arriving at a configuration over which the greatest possible portion of the airflow will be smooth, or laminar; that is, non-turbulent, with a resulting reduction in aerodynamic drag. To this end, according to current practice, models of a number of proposed configurations are constructed and tested in a wind tunnel and the aerodynamic characteristics of each, including drag, are thereby obtained. The wind tunnel tests of each single configuration may involve a series of runs at varying airflow velocity with the model positioned in a variety of attitudes with respect to the airflow. It will thus be seen that the test of each configuration may require large amounts of valuable tunnel time, and that analysis of the large masses of data thereby accumulated represents a formidable problem. Recently, in order to conserve wind tunnel time and simplify the problem of data reduction and analysis, some effort has been made to obtain comparative results by constructing models which may be propelled under actual operating conditions through the earth's atmosphere. These models are provided with a variety of instrumentation, and the data collected therefrom is telemetered to a ground receiving station. In the case of small missile and rocket configurations, a full scale model may be utilized for these tests, and in the case of other configurations a small scale model thereof may be mounted on the nose of a rocket vehicle. The drag balance hereinafter disclosed is intended for use in tests of this nature, and is so designed that a complete history of the drag forces acting upon the model during the entire flight may be transmitted to a remote receiving station and there recorded in permanent form.

It is further contemplated that the balance of the present invention could be used in other than aeronautical applications. For example, the balance could equally well be utilized in determining the hydrodynamic drag characteristics of a vehicle moving submerged in a liquid, such as a torpedo or a submarine vessel model.

Accordingly, it is an object of the present invention to provide a new device for instantaneously measuring frictional forces acting to impede movement of a body through a fluid medium.

A still further object of the instant invention is the provision of a new device for measuring aerodynamic drag forces acting upon an aerial vehicle moving through the atmosphere.

Another still further object of the present invention is the provision of a device for measuring force differential between forces applied to one portion of a body to produce motion thereof, and forces developed upon another portion of the body tending to oppose this motion.

Other objects and many of the attendant advantages of the invention will be readily appreciated as the same becomes better understood by reference to the following detailed description when considered in connection with the accompanying drawings wherein:

FIG. 3 is a front elevational view of the drag balance;

FIG. 4 is a sectional view of the drag balance taken along line 4—4 of FIG. 3; and, FIG. 5 is an isometric exploded view of the drag balance with the components thereof shown partially in section.

Figure 1:
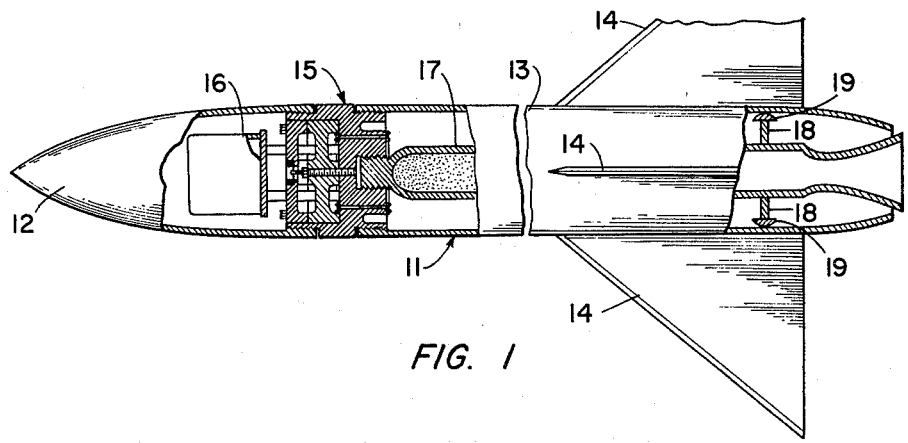
FIG. 1 is a side elevational view, partially in section, of a rocket powered aerial vehicle provided with the drag balance of the present invention.

Referring now more particularly to the drawings wherein like reference numerals designate identical parts throughout the several views, and more particularly to FIG. 1, there is shown a full scale rocket powered aerial vehicle generally designated by the reference numeral 11. Vehicle 11 is provided with a substantially conical shell nose section 12 and a cylindrical shell after section 13 to which stabilizing fins or surfaces 14 are connected. The sections 12 and 13 are joined, as by threaded connections or the like, to the drag balance, generally designated by the reference numeral 15, which is interposed between sections 12 and 13. Telemetering equipment 16 positioned within the nose section 12 is also connected to drag balance 15, and a rocket motor 17 positioned within the after section 13 is attached at the forward end thereof to drag balance 15. The after end of motor 17 is concentrically maintained within section 13 in relatively movable relation therewith by any suitable means, which may take the form, as illustrated, of a plurality of radially disposed arms 18 rigidly fixed to motor 17 and provided at their outermost ends with feet 19 positioned in sliding contact with the inner surface of the cylindrical section 13. The construction of drag balance 15 is such, as will be more fully described hereinafter, that telemetering equipment 16 and rocket motor 17 may experience limited longitudinal relative movement as a unit with respect to the shell sections 12 and 13 of vehicle 11. This longitudinal relative movement results from the oppositely directed forces imposed upon vehicle 11 by motor thrust and atmospheric drag. The atmospheric drag forces are proportional to this relative movement, and a signal based thereon may be transmitted by telemetering equipment 16 to the remote receiving station to provide a record of drag versus time during the flight of vehicle 11. It will be understood by one skilled in the art that inertia loads resulting from accelerations of the aerial vehicle may be superimposed upon the atmospheric drag loads and have a tendency to modify the degree of relative movement between the vehicle shell and the propulsion means therefor. Since these loads are proportional to the weight of the vehicle shell and compensation therefor is necessary, the desirability of keeping the effective weight of the shell to a minimum is apparent. The rigid connection between the telemetering equipment 16 and the vehicle propulsion means serves this purpose, and also permits modification of means 16 without the necessity of recompensation.

Figure 2:
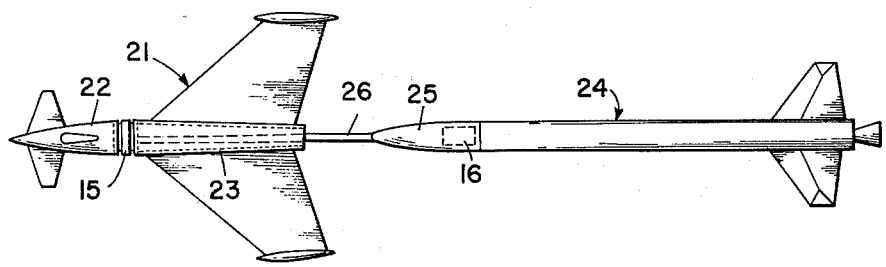
FIG. 2 is a plan view of an aerial vehicle model provided with the drag balance of the present invention and combined with rocket propulsion means.

FIG. 2 shows in plan view a small scale model, generally designated by the reference numeral 21, of an aerial vehicle configuration adapted to be propelled through the atmosphere. Model 21 is provided with a fuselage comprising a forward section 22 and a hollow after section 23. A drag balance 15 is interposed between fuselage sections 22 and 23 in similar manner to the mounting of drag balance 15 between sections 12 and 13 of the rocket vehicle shown in FIG. 1. A propulsion rocket, generally designated by the reference numeral 24, is provided as a source of power for propelling model 21 through the atmosphere. Rocket 24 comprises a nose section 25 preferably of shell construction; the hollow interior thereof being adapted for mounting telemetering equipment 16 therein. Projecting forwardly from the nose of rocket section 25 is a boom 26 which preferably is tubular in cross-section. The boom 26 enters the hollow after section 23 of model 21 and the forward end thereof is attached to drag balance 15. The boom 26 is concentrically maintained within after section 23 in relatively movable relation therewith similarly to the mounting of rocket motor 17 within the after section of rocket vehicle 11. Telemetering equipment 16 is mounted in rocket section 25 and is electrically connected through hollow boom 26 to drag balance 15. Longitudinal relative movement between model 21 and boom 26 is recorded and transmitted by telemetering equipment 16 to a remote monitoring station, and the drag forces acting upon model 21 are obtained therefrom, as hereinbefore set forth with respect to the rocket vehicle 11.

Figure 5:
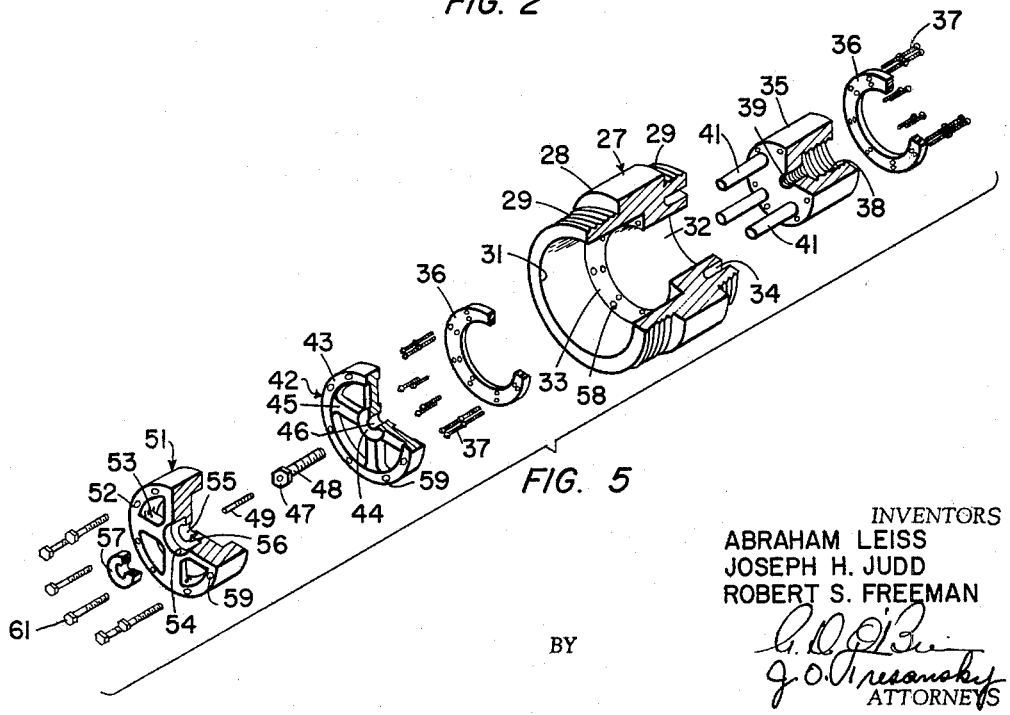

The structural details of drag balance 15 are clearly shown in FIGS. 3 to 5. A housing member, generally designated by the reference numeral 27, is provided for connecting balance 15 with the fuselage of the aerial vehicle configuration under investigation. Housing 27 is a cylindrical element having a bore therethrough coinciding with the longitudinal axis of the vehicle. The outer surface of housing 27 comprises a central annular portion 28 having the same diameter as the outer surface of the two body portions of the aerial vehicle, and annular end portions 29 of reduced diameter. These end portions 29 may be provided with external screw threads and the ends of the vehicle body portions engageable therewith may be provided with matching internal screw threads, whereby the body portions may be screwed down over portions 29 until the edges thereof butt against the edges of annular central portion 28 of housing 27 thereby to obtain a flush joint surface. It is also contemplated that portions 29 could have a smooth surface slidable into the vehicle body portions, and that a joint therebetween could be effected as by rivets, screws, or the like. Housing 27 is provided with a bore 31 for approximately the forward half of the length thereof of fairly large diameter, but such that the wall thickness of forward end portion 29 is sufficient to carry the loads imposed thereon by the forward body portion of the aerial vehicle. A bore 32 through the remaining portion of housing 27 is substantially smaller in diameter than bore 31 in the forward portion thereof; the abrupt transition in bore diameters forming a transversely disposed annular shoulder 33 at about the longitudinal midpoint of housing 27. Since the wall thickness of the after end portion 29 thus formed is considerably greater than the wall thickness of the forward end portion 29, an annular cutout 34 may be formed in the after edge of this wall portion to reduce the weight of housing 27.

A thrust mount 35 is concentrically positioned within the reduced bore portion 32 of housing 27. Mount 35 is cylindrical in shape with an outside diameter on the order of 0.10 inch less than bore 32, and is substantially equal in length to bore 32. The gap of approximately 0.05 inch between the outer cylindrical surface of thrust mount 35 and the inner cylindrical surface of bore 32 may be filled with a suitable conventional motion damping compound. A pair of annular gaskets 36 formed of a flexible sealing material such as neoprene, or the like, may be provided to close the ends of the gap between mount 35 and bore 32 and maintain the damping compound therein. The forward face of mount 35 is placed flush with annular shoulder 33, a gasket 36 is placed to cover the gap and extend over the forward surfaces of mount 35 and shoulder 33, and is connected to both surfaces by a plurality of screws 37. The second gasket 36 is similarly secured to the rear surface of mount 35 and the after edge of the wall of the after end portion 29 by screws 37. The gaskets 36 are made sufficiently flexible to permit limited relative motion in a longitudinal direction between thrust mount 35 and bore 32 of housing 27.

The after surface of thrust mount 35 is provided with a central aperture 38 extending inwardly for approximately half the length of the mount. The longitudinal wall of aperture 38 is provided with screw threads for effecting a screw connection with the propulsion means of the aerial vehicle. As shown in FIG. 1, the forward end of rocket motor 17 is provided with a longitudinally aligned externally threaded plug portion directly threaded into aperture 38. In the case of the aerial vehicle shown in FIG. 2, the forward end of the propulsion rocket nose boom 26 is provided with external screw threads and is engaged in aperture 38. It will thus be readily apparent to one skilled in the art that the thrust developed by the vehicle propulsion means may be introduced directly into drag balance 15 through thrust mount 35. A central aperture 39 is also provided in the forward face of the mount 35 and extends rearwardly thereinto; the longitudinal wall thereof being threaded. Aperture 39 is considerably smaller in diameter than aperture 38.

A drag transfer element, generally designated by the reference numeral 42, is positioned within the bore portion 31 of housing 27. Element 42 is provided with a perimetrical annular rim portion 43 having an outside diameter slightly less than the diameter of bore 31 and an inside diameter slightly greater than the diameter of the outer edge of gaskets 36. The thickness of rim portion 43 is equal to about one third of the length of bore portion 31 of housing 27. Element 42 is also provided with a circular central portion 44 equal in thickness to rim portion 43 and disposed concentrically within rim portion 43 with the forward faces of portions 43 and 44 occupying a common plane and the after faces of these elements occupying a common plane parallel thereto. The outer diameter of central portion 44 is considerably less than the inner diameter of rim portion 43. Four radially disposed arms 45 extend between and connect the outer circular surface of central portion 44 and the inner circular surface of rim portion 43, dividing the space between portions 43 and 44 into quadrants. The arms 45 are symmetrically disposed with respect to the forward and after faces of elements 43 and 44, but are only about half the thickness thereof. An internally threaded central aperture 46 is formed through central portion 44; the threads thereof corresponding to the threads of aperture 39 in thrust mount 35. The drag transfer element is placed with the after face of rim element 43 in contact with shoulder portion 33 of housing 27, and the after face of central portion 44 in contact with the forward face of thrust mount 35. A bolt having a head portion 47 and a shank portion 48 externally threaded correspondingly with the threads of apertures 46 and 39 is used to rigidly interconnect portion 44 of drag transfer element 42 and thrust mount 35. It will be noted that the reduced thickness of radial arms 45 permits the arms to clear the gasket 36 and screws 37 positioned adjacent thereto. The head portion 47 of the bolt is provided with a central internally threaded aperture, and a cylindrical element 49 composed of a magnetizable material, such as iron or the like, is threaded thereinto. Element 49 is smaller in diameter than bolt shank 48, and projects from bolt head 47 in the direction opposite that of shank 48.

A position recorder mount, generally designated by the reference numeral 51, is positioned in bore 31 of housing 27 forwardly of the drag transfer element 42. Recorder mount 51 is provided with a rim portion 52 corresponding to the rim portion 43 of element 42 but having approximately twice the thickness thereof. Recorder mount 51 is also provided with arms 53 corresponding with the arms 45 of element 42; the arms 53 dividing the space within rim portion 52 into four quadrants aligned with the quadrants formed by arms 45 of element 42. The forward face of each of the arms 53 is coplanar with the forward face of rim portion 52 of recorder mount 51, but the thickness of the arms 53 is only about half the thickness of rim portion 52, thereby providing clearance for bolt head 47. At the intersection of arms 53 a central bore is formed therethrough; the forward half 54 of the bore being greater in diameter than the after half 55 thereof, and the abrupt transition of bore diameters forming an annular shoulder 56 therein at the midpoint thereof. An insulated electrical coil 57 having a hollow core is placed within bore portion 54 in abutment with shoulder 56 and is secured in position as with a clip member, not shown, or other suitable means. The diameter of the core of coil 57 may be substantially equal to the diameter of bore portion 55, which in turn is made sufficiently large for cylindrical element 49 to pass therethrough without contacting the wall thereof. Conductors, not shown, are connected between coil 57 and telemetering equipment 16.

A plurality of internally threaded holes 58 are formed in shoulder 33 of housing 27 parallel to the longitudinal axis of drag balance 15, and a plurality of apertures 59 aligned therewith are formed in the rim portions 43 and 52 of drag transfer element 42 and position recorder mount 51, respectively. A plurality of bolts 61 are passed through the aligned apertures 59 and are threaded into holes 58, thereby rigidly interconnecting housing 27, the rim portion 43 of drag transfer element 42, and position recorder mount 51.

The telemetry equipment 16, as hereinbefore set forth, is mounted to move as a unit along with the rocket propulsion means of the aerial vehicle under investigation. In the case of vehicle 11 shown in FIG. 1, this may be accomplished by providing the forward face of thrust mount 35 with four forwardly projecting cylindrical mounting members 41 arranged to pass between the arms of element 42 and mount 51, and terminating beyond the foremost portion of the assembled drag balance 15. Telemetry equipment 16 positioned within nose section 12 of vehicle 11 may be connected to the free ends of the members 41. When the drag balance is used with a vehicle of the type shown in FIG. 2 the mounting members 41 may be eliminated.

In operation, drag forces developed upon the airframe of the vehicle under investigation are transferred to the housing 27 of drag balance 15, since housing 27 is interconnected with all portions of the vehicle exposed to the airstream. Since arms 45 of transfer mount 42 provide the sole structural connection between housing 27 and thrust mount 35, the drag forces may be considered as loads applied at the outer ends of arms 45. Arms 45 act as fixed end beams and deflect under these loads; the outer ends thereof shifting rearwardly with respect to the inner ends, and causing longitudinal relative motion in the forward direction of thrust mount 35 within bore 32 of housing 27. Coil 57, which is relatively immovable with respect to housing 27, is connected to a suitable source of unidirectional electrical energy, and current flows therethrough, establishing an electromagnetic field within the hollow core of the coil. The magnetizable cylinder 49 is positioned to move into the field within the core of coil 57 as thrust mount 35 moves forward in bore 32, varying the magnetic field and thereby varying the current flowing through coil 57. This variation in coil current is directly proportional to the movement of cylinder 49 within coil 57, and the corresponding deflection between the ends of arms 45. A continuous record of this variation in coil current may be transmitted by equipment 16 to a remote receiving station, where it may be recorded using conventional equipment calibrated to measure drag in pounds, based upon the deflection of arms 45.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A drag balance for measuring drag forces developed upon the external surfaces of an elongate vehicle provided with propulsion means moving through a fluid medium, comprising a housing member adapted to be transversely positioned within said vehicle and rigidly interconnected with said external surfaces, a mount positionable within said vehicle adjacent said housing member and adapted for rigid connection with said propulsion means, an element having a perimetrical portion rigidly connected to said housing member, a central portion rigidly connected to said mount, and a flexible portion between said perimetrical portion and said central portion to permit limited relative movement between said housing member and said mount in the direction of travel of said vehicle, said mount being forwardly movable with respect to said housing member upon the development of drag forces a distance proportional to the magnitude of said forces, and means comprising one portion rigidly positioned with respect to said mount and another portion rigidly positioned with respect to said housing member for generating an electrical signal proportional to the relative movement of said housing member and said mount.

2. The drag balance as defined in claim 1 and including means mounted relatively immovable with respect to said mount for transmitting said electrical signal to a remote receiving station.

3. The drag balance as defined in claim 2 and including means for damping relative movement between said housing member and said mount.

4. A drag balance for measuring frictional forces tending to impede movement through a fluid medium of a vehicle of the type having an elongate hollow body section and propulsion means positioned within said body section along the longitudinal axis thereof with at least a terminal portion slidably communicating with said fluid medium through the after end of said body section, said drag balance comprising a housing member transversely positionable within and adapted for rigid interconnection with said hollow body section and having a bore therethrough concentric with said longitudinal axis; a mount concentrically positioned within said bore and adapted for rigid connection with said propulsion means; an element having a perimetrical portion rigidly connected to said housing member, a central portion rigidly connected to said mount, and a flexible portion between said perimetrical portion and said central portion to provide for limited relative longitudinal movement between said mount and said bore; means for damping said movement between said mount and said bore; an electrically energized coil rigidly mounted with respect to said housing member and having a hollow core concentrically positioned with respect to the longitudinal axis of said bore; a magnetizable element rigidly mounted with respect to said mount and penetrable into said hollow core upon forward movement of said mount in said bore for varying current flow in said coil; and means rigidly positioned with respect to said mount for transmitting a signal proportional to said coil current variation to a remote receiving station.

5. A drag balance for measuring drag forces tending to impede movement through the atmosphere of an aerial vehicle of the type having an elongate cylindrical hollow body section and propulsion means having a forwardly projecting elongate cylindrical portion concentrically positioned within said body section along the longitudinal axis thereof and longitudinally relatively movable therein, said drag balance comprising a cylindrical housing member concentrically positionable within and adapted for interconnection with said body section, said housing member having a central opening therethrough concentric with the longitudinal axis of said housing member comprising a forward constant diameter interior wall defining a bore and an after constant diameter interior wall defining a bore, said bores being substantially equal in length, the diameter of said after bore being smaller than the diameter of said forward bore to form a transversely disposed annular shoulder at substantially the midpoint of said opening; a cylindrical mount smaller in diameter than said after bore concentrically positioned within said after bore and having an after surface adapted for connection with the forward end of said cylindrical portion of said propulsion means, said cylindrical mount having a forward surface substantially coplanar with said annular shoulder; an element positioned within said forward bore having a perimetrical rim portion abutting said annular shoulder and rigidly connected thereto, a central portion abutting the forward surface of said mount and rigidly connected thereto, and flexible arm members extending between said perimetrical portion and said central portion providing for limited longitudinal relative motion between said cylindrical mount and said after bore; means for damping said relative motion between said housing member and said after bore portion; and means comprising one portion rigidly positioned with respect to said cylindrical mount and another portion rigidly positioned with respect to said housing member for generating an electrical signal proportional to the relative movement of said housing member and said mount.

6. The drag balance as defined in claim 5 and including means mounted relatively immovable with respect to said mount for transmitting said electrical signal to a remote receiving station.

7. The drag balance as defined in claim 6 wherein said means for generating said electrical signal comprise an electrically energized coil rigidly mounted with respect to said housing member and having a hollow core concentrically positioned with respect to the longitudinal axis of said central opening, and a magnetizable element rigidly mounted with respect to said cylindrical mount and penetrable into said hollow core upon forward movement of said cylindrical mount in said after bore for varying current flow in said coil.

References Cited in the file of this patent

UNITED STATES PATENTS

| | | |
|---|---|---|
| 2,724,966 | Northrop et al. | Nov. 29, 1955 |
| 2,782,636 | Peucker | Feb. 26, 1957 |
| 2,935,870 | Lyons | May 10, 1960 |